United States Patent [19]
Griswold

[11] Patent Number: 5,940,504
[45] Date of Patent: Aug. 17, 1999

[54] LICENSING MANAGEMENT SYSTEM AND METHOD IN WHICH DATAGRAMS INCLUDING AN ADDRESS OF A LICENSEE AND INDICATIVE OF USE OF A LICENSED PRODUCT ARE SENT FROM THE LICENSEE'S SITE

[75] Inventor: Gary N. Griswold, Schenectady, N.Y.

[73] Assignee: Infologic Software, Inc., Troy, N.Y.

[21] Appl. No.: 07/907,934

[22] Filed: Jun. 29, 1992

Related U.S. Application Data

[63] Continuation-in-part of application No. 07/724,180, Jul. 1, 1991, abandoned.

[51] Int. Cl.⁶ ............................................. G06F 17/60
[52] U.S. Cl. ............................. 380/4; 705/32; 705/44; 705/412
[58] Field of Search ................................. 364/401, 406, 364/464.01, 464.04; 380/3, 4, 5, 25; 395/200, 325, 575, 700, 725; 705/32, 44, 412

[56] References Cited

U.S. PATENT DOCUMENTS

| | | |
|---|---|---|
| 4,020,326 | 4/1977 | Coulthurst .............................. 235/381 |
| 4,685,055 | 8/1987 | Thomas ..................................... 380/4 |
| 4,740,890 | 4/1988 | Tobin . |
| 4,893,248 | 1/1990 | Pitts et al. ............................... 705/400 |
| 4,893,332 | 1/1990 | Brown ............................... 379/106.04 |
| 4,937,863 | 6/1990 | Robert et al. ............................... 380/4 |
| 4,977,594 | 12/1990 | Shear .......................................... 380/4 |
| 5,010,571 | 4/1991 | Katznelson ................................. 380/4 |
| 5,014,234 | 5/1991 | Edwards, Jr. . |
| 5,023,907 | 6/1991 | Johnson et al. ............................ 380/4 |
| 5,191,611 | 3/1993 | Lang ........................................ 380/25 |
| 5,204,897 | 4/1993 | Wyman ....................................... 380/4 |
| 5,258,906 | 11/1993 | Knoll et al. ................................ 705/2 |

OTHER PUBLICATIONS

Stallings, W. "Data and Computer Communications" 1985 Macmillan Publishing Company. pp. 199–203.

*Primary Examiner*—Kenneth S. Kim
*Attorney, Agent, or Firm*—Pillsbury Madison & Sutro LLP

[57] ABSTRACT

A license management system and method for recording the use of a licensed product, and for controlling its use in accordance with the terms of the license. A licensed product invokes a license check monitor at regular time intervals. The monitor generates request datagrams which identify the licensee and the product and sends the request datagrams over a communications facility to a license control system. The license control system maintains a record of the received datagrams, and compares the received datagrams to data stored in its licensee database. Consequently, the license control system transmits reply datagrams with either a denial or an approval message to the monitor. The monitor terminates further use of the product if it receives a denial message. The monitor generates its own denial message if its request datagrams are unanswered after a predetermined interval of time. The datagrams are counted at the control system to provide billing information.

105 Claims, 8 Drawing Sheets

LICENSING MANAGEMENT SYSTEM AND METHOD IN WHICH DATAGRAMS INCLUDING AN ADDRESS OF A LICENSEE AND INDICATIVE OF USE OF A LICENSED PRODUCT ARE SENT FROM THE LICENSEE'S SITE

CROSS-REFERENCE TO RELATED APPLICATION

This application is a continuation-in-part of application Ser. No. 07/724,180, filed on Jul. 1, 1991 now abandoned.

BACKGROUND

1. Field of the Invention

The present invention generally relates to systems for managing licenses of products such as computer software, video games, CD-ROM information, movies and other video products, music and other audio products, multimedia products, and other systems for up-to-date recording of actual usage of such a licensed product to enable efficient billing therefor.

2. Description of Related Art

Licenses for information products such as computer software, music, video products and the like usually provide licensees with limited rights. The licenses may restrict sites of use, duration of use, or number of concurrent uses of the products. The licenses also may limit the use of the products depending on currentness of licensee's payments. However, enforcing the conditions of the licenses is difficult, because, in general, the licensed products may be easily copied or "pirated" and used without the licensor's knowledge.

Compliance with limited license rights has been encouraged with copy protection. Known methods of computer software copy protection include putting a physical hole or mark on the diskette containing a product, or placing data on the diskette in a location where no data is expected. A disk with an illegally copied software product usually would not contain the marks. At the beginning of its operation, a copy-protected, but illegally copied software product would search its own diskette for the marks. Upon failing to detect the marks, the software would abort from its normal procedures.

Most software products sold today do not have such copy protection, partly because copy protection renders legitimate duplication of copy protected software difficult, but not impossible. Copy protection frustrates the making of legitimate copies, while not eliminating unauthorized copying. Many software publishers have experienced higher sales by eliminating copy protection schemes.

Another method for enforcing limited licensing rights of computer software is described in U.S. Pat. No. 4,932,054 to Chou. Chou describes a "coded filter" hardware device which is plugged into a port of a computer. The "coded filter" outputs an authorization control code when a predetermined control code is sent to it. The licensed software functions properly only if the "coded filter" transmits the correct authorization control code to the software.

While devices such as described by Chou have existed for several years, they have not been well accepted by the market. Since the device is attached to the outside of a computer, it can easily be lost or stolen, preventing the use of licensed software. In addition, if a licensee purchased a number of software products, each of which used Chou's protection scheme, the licensee would collect a stack of "coded filters."

Hershey, in U.S. Pat. No. 4,924,378, describes a method for limiting the number of concurrent uses of a licensed software product. Each workstation of a network has a license storage area in its local memory. License Management System (LMS) daemons are provided in the network in a number corresponding to the permissible number of concurrent uses of the software product. To use the software, a work station stores a daemon in its license storage area. If all daemons are in use, no further work stations may use the software.

Robert et al., in U.S. Pat. No. 4,937,863, describe a similar invention. This invention includes a license management facility which accesses a database of license information related to licensed computer software programs. When a user attempts to use a licensed program, the license management facility first checks the database. Access to the licensed product is prevented if licensing conditions related to the product are not satisfied (e.g., expiration of licensing dates, etc).

While the Robert et al. and Hershey patents show effective techniques for controlling licensed computer software, each also reveals components that cannot be easily managed by an average user. A system manager, or someone with special access privileges to the internals of a machine, must install the licensed software. This hinders the distribution of the software.

Licensable products other than computer software have not generally been copy-protected. For example, video tapes can be easily copied by anyone with two VCR machines, and audio tapes and music CDs can be easily copied to tape. Computer CD-ROMs can be copied to magnetic disk; however, their large information storage capacity relative to that of magnetic disks makes this a very expensive proposition. The introduction of digital audio tape is being delayed, because some view its ability to easily produce very high quality copies as a threat to music royalties.

Hellman, in U.S. Pat. No. 4,658,093, describes means to bill by usage. This is accomplished via communication of an encrypted authorization code from a licensor to a base unit at the licensee's site. The encrypted authorization code contains information related to an identification of the base unit, a number of uses requested, and a random or non-repeating number; however, implementation of Hellman's scheme requires a "base unit", such as a computer, video game unit, record player, video recorder, or video disk player, with a unique identification number. The requirement is difficult to satisfy, because, at the present, only a fraction of such systems on the market have an internally readable serial number for identification. In addition, vendors of these systems provide no guarantees for the uniqueness of any given device's serial number. Furthermore, an internal serial number can change when hardware maintenance is performed on the device. Also, Hellman's approach requires that an identical copy of each software product be stored at the authorization site. These copies are used in the generation of unique keys. The unstated assumption that all copies of a specific version of a software product are identical is unrealistic. Minor bug fixes to software are often made without generating a new version of the product. Also, some software products, such as those which run on Macintosh computers, are self-modifying.

While Hellman's invention counts each use of the software, it does not monitor the duration of use. Thus, Hellman's system would not be able to bill for extensive use of licensed software if the software were continuously operated. Finally, while Hellman suggests the inclusion of an automated communication system as part of his invention, he does not disclose how this communication system could be implemented. Instead, he mentions non-automated use of telephone and mail. In summary, Hellman's patent is an interesting discussion of cryptographic techniques, but it does not provide a practical, real-world implementation of those techniques.

Shear, in U.S. Pat. No. 4,977,594, describes a system and method to meter usage of distributed databases such as CD-ROM systems. The method describes a hardware module which must be part of the computer used to access the distributed database. This module retains records of the information viewed. Once the module storage is filled, the module must be removed and delivered to someone who will charge for the usage recorded therein and set the module back to zero usage. Like Hellman's method, this method requires a hardware module which must be incorporated within the computer so the system can control user access. No database publisher will be able to use this method until there are a very large number of units containing such modules. Hardware manufacturers will be hesitant to include the module in the design of their computers until there is sufficient demand from customers or publishers for this system. The method and apparatus according to the present invention can be implemented entirely in software and hence does not require special, dedicated computer subsystems.

SUMMARY OF THE INVENTION

It is an object of the present invention to provide a license management system and method which can ensure that a licensed product is used only on machines under which it is licensed.

It is another object of the present invention to provide a license management system and method which may terminate access to a licensed product once its license has expired.

It is yet another object of the present invention to provide a license management system and method which may terminate access to a licensed product when payment for a license is overdue.

It is a further object of the present invention to provide a license management system and method which can limit the number of concurrent uses of a licensed product.

It is yet another object of the present invention to provide a license management system and method which can bill licensees for the duration of actual usage of a licensed product.

The present invention provides an advantageous feature of quickly and effectively implementing license agreements between a licensor and licensee.

The present invention provides another advantageous feature of allowing logic used to control licenses to be easily changed.

The present invention provides yet another advantageous feature of detecting, at the licensor's site, many types of attempts to alter the license management system.

The present invention provides a further advantageous feature of permitting anyone without special access privileges to install a licensed product.

In the present invention, a licensed product generates request "datagrams," messages transmitted over a communications network. The request datagrams are sent to the licensor's site. At the licensor's site the datagram is compared to information stored in a license database. After the comparison, a reply datagram is sent to the licensee. Upon receiving the reply datagram, the licensed product reacts in accordance with the instructions therewithin. For example if a reply datagram contained a "denial," the licensed product would display an appropriate message to the user and then suspend further execution of its programs.

In the present invention, the licensed product is implemented on a network node attached to a communications network that includes the licensor. The network node may be a computer, a CD-ROM player, a tele-computer or other multimedia machine, or any other appropriate device. The node may also be an intelligent type of consumer electronic device used for presenting information, such as an intelligent television, VCR, videodisk player, music CD player, audio tape player, telephone or other similar device. Further, the communications network may be any two-way network such as a computer network, telephone network, a cellular telephone network or other wireless network, a two-way cable TV network, or any other equivalent system.

Should the user detach the node from the network, the licensed product will fail to receive reply datagrams. Upon several failures to receive reply datagrams, the licensed product will generate its own denial.

After a request datagram has been sent out, a user may be permitted to use the licensed product for a limited duration. This feature may be necessary because of the delays in network communications. When networks are sufficiently fast, use of a licensed product can be postponed until the reply datagram is received.

In the preferred embodiment of the present invention, licensees' network addresses are used to identify the licensees. Other embodiments may use a licensed product serial number or hardware serial numbers for the identification.

A licensed product as in the present invention generates a request datagram after each period of product use. The number of request datagrams received by the licensor can be used to bill the licensee. For example, if datagrams are sent after every hour of product use, the licensee will be billed for the amount equal to the number of request datagrams received by the licensor multiplied by the hourly rate.

The embodiments of the present invention may incorporate a query system at a licensor's site for reporting on problem datagrams. This would allow the licensors to take appropriate actions in accordance with problems associated with each datagram.

BRIEF DESCRIPTION OF THE DRAWINGS

These and other objects and advantages of this invention will become more apparent and more readily appreciated from the following detailed description of the presently preferred exemplary embodiment of the invention, taken in conjunction with the accompanying drawings, of which.

DETAILED DESCRIPTION OF THE PRESENTLY PREFERRED EXEMPLARY EMBODIMENT

Figure 1:
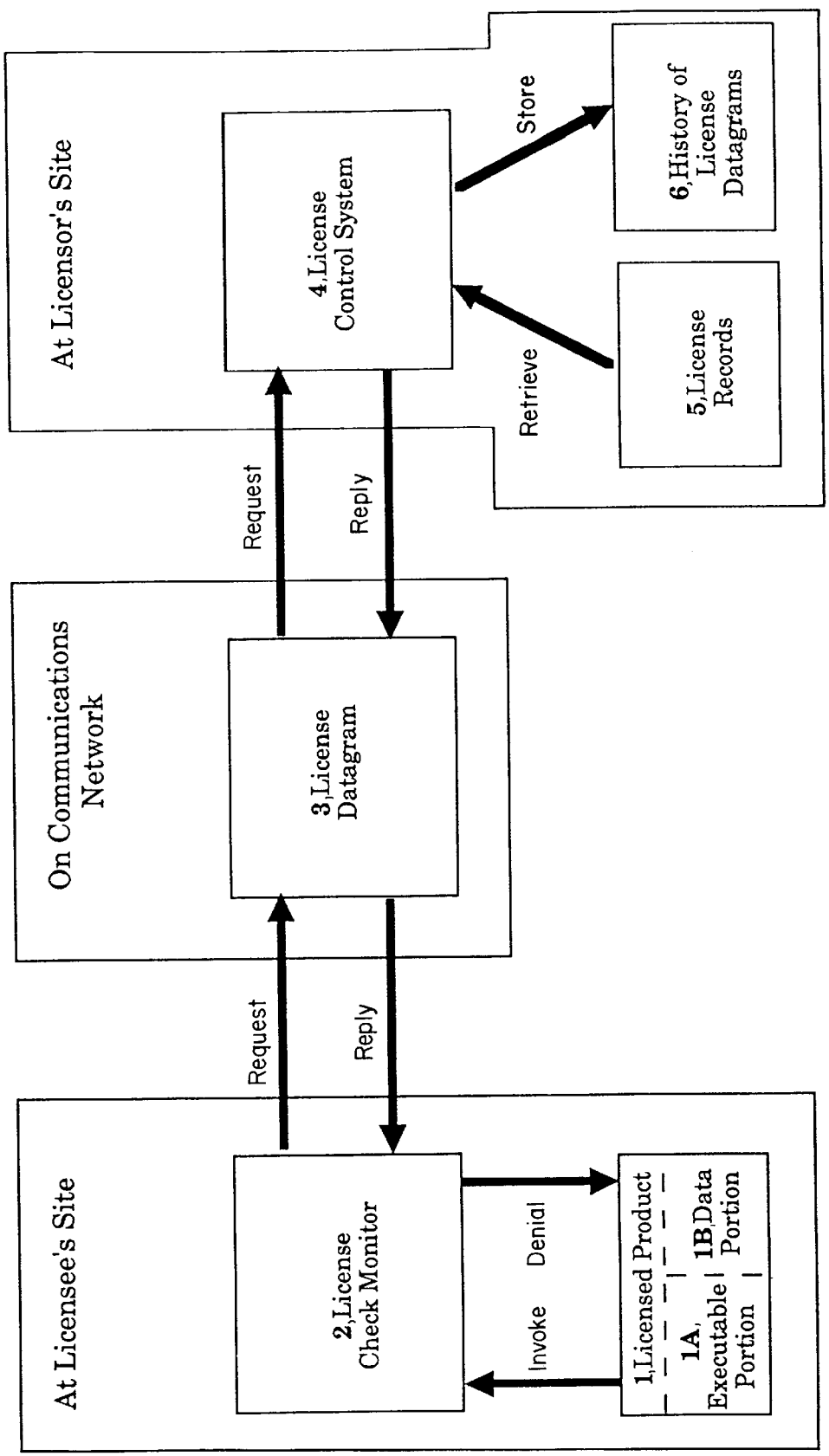
FIG. 1 is a general block diagram of the preferred exemplary embodiment of the present invention.

As shown in FIG. 1, a licensed product 1 is located at a licensee's site. Product 1 may include a data portion 1B and a functional portion 1A such as computer software product or any other kind of information product used to control use of data portion 1B. If data portion 1B is CD-ROM database information, functional portion 1A should enable the licensee to search indexes and display text. If data portion 1B is video information, functional portion 1A should control the display of the video information. For audio information, functional portion 1A should play the audio information. If data portion 1B is an electronic book, functional portion 1A should display and turn pages. The above examples show some of the ways functional portion 1A can control data portion 1B; however, they are hardly exhaustive.

By including in product 1 both information and software which controls the information, product 1 is an executable product. Non-software information in product 1 is preferably encrypted so that it cannot be easily extracted from the product.

License check monitor 2 sends license datagrams 3 to the licensor and also receives license datagrams 3 from the licensor. License check monitor 2 also prevents further use of product 1 when a datagram 3 containing a "denial" message is received.

License datagrams 3 are messages that describe information related to the use of licensed product 1. Datagrams 3 are sent over a communications network between the licensee and licensor. Initially, the licensee sends a request datagram 3 over the network to the licensor. The licensor then returns a reply datagram containing either an approval or denial. It is also possible to implement the present invention by having the licensor transmit a reply datagram only for approvals.

At the licensor's site, license control system 4 makes licensing decisions by comparing request datagram 3 with license records 5. After the comparison, control system 4 stores information related to request datagram 3 into history of license datagram record 6. It is noted that request datagrams 3 are periodically sent while product 1 is in use. Thus, the history of license datagrams in record 6 provides means for measuring the duration of use of product 1.

Figure 2:
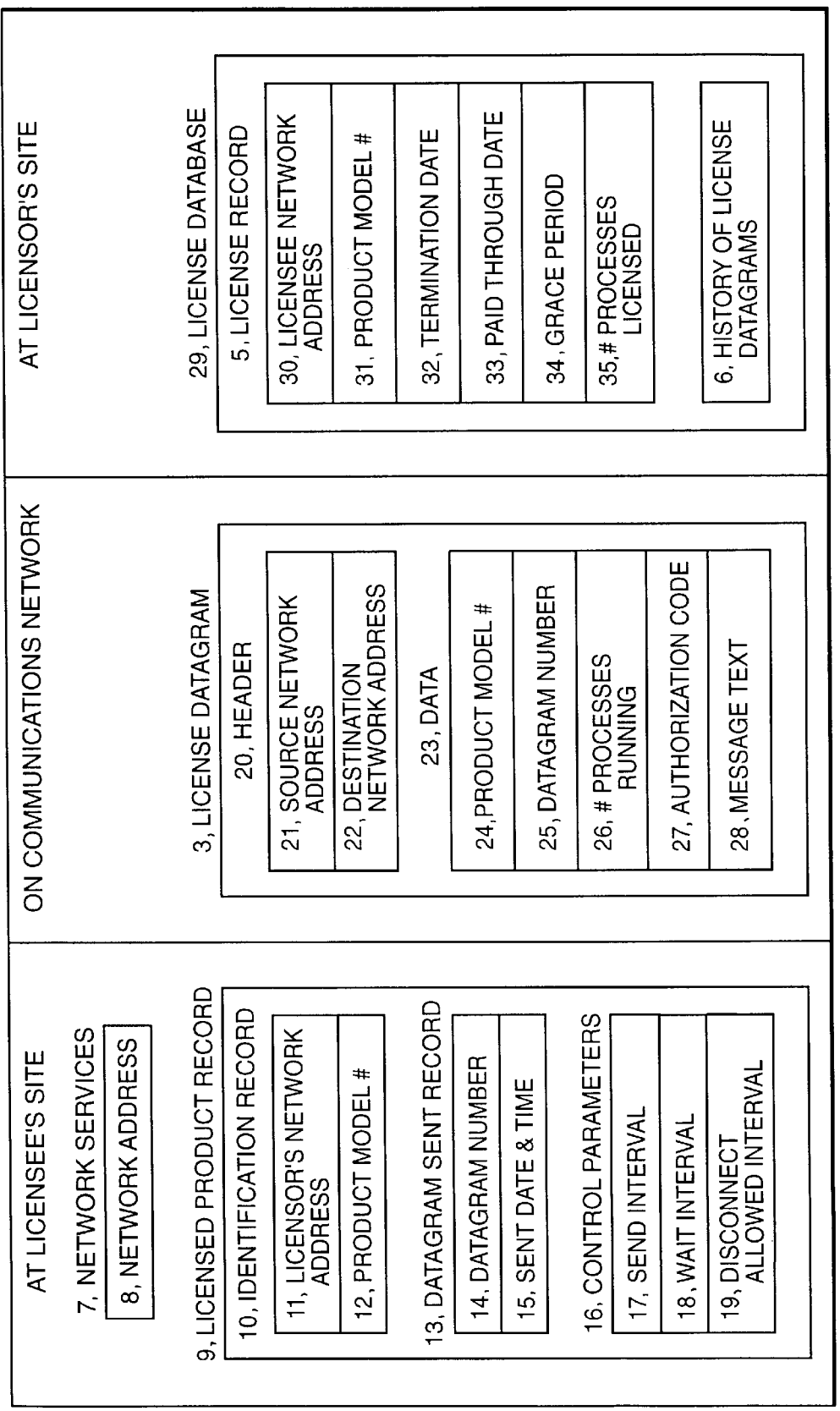
FIG. 2 shows representative diagrams of the contents and formats of data at licensee's site, contained in datagrams, and at licensor's site.

Representations of data and records stored at the licensee's site, contained in datagrams, and stored at the licensor's site are illustrated in FIG. 2. At the licensee's site, network service 7, which handles delivery and transmission of datagrams 3, supplies network address 8. It is by this address that license control system 4 identifies a location of use of product 1.

Licensed product record 9 is contained within monitor 2. Within the license product record 9 is an identification record 10, which contains the following two items: licensor's network address 11, and product model number 12 that identifies product 1. When a licensor has only one product, or uses different licensor network addresses 11 for each product, product model number 12 may not be needed.

Datagram sent record 13 stores information about the last sent datagram 3. It includes a datagram number 14, which uniquely identifies the last transmitted datagram 3, and the date and time 15 when the last datagram 3 was sent from the licensee's site.

Licensed product record 9 also contains control parameters record 16, which is used for controlling the timing of key events in the communication of license check monitor 2 with license control system 4. Send interval 17 specifies a time interval between each transmission of a new datagram 3 from the licensee to the licensor.

Wait interval 18 is the length of time that monitor 2 waits to receive a reply datagram 3 before resending the same request datagram 3. The duration of this interval depends on the speed of the communications network being used to deliver datagrams 3.

Disconnect allowed interval 19 is the duration of time that monitor 2 allows product 1 to be used without a reply datagram 3 from the licensor. The duration of this interval depends on the reliability of the communications network. The interval must be long enough to take into consideration network downtime. For example, suppose a message was sent from the licensor and the network went down just afterwards. Disconnect allowed interval 19 should be long enough to allow the network to resume its normal operation and successfully deliver datagrams 3 from the licensor; otherwise, the licensee would be forced to stop using product 1 until the network was operational.

License datagram 3 contains header 20. Header 20 is used during execution of low level communication protocols within the network. Source network address 21 is the network address from where datagram 3 is sent. Destination network address 22 is the network address to where datagram 3 is sent. Additional data may be included in header 20 if required by low level protocols used in delivering datagrams 3.

Data 23, a part of datagram 3, conveys a message, and contains a number of fields. Product model number 24 and datagram number 25 identify product 1 and datagram 3, respectively. It is noted that retransmitted datagrams have an identical datagram number. Duplicate datagrams must be identified at a licensor's site so that they do not all contribute in billing a licensee.

Each datagram number 25 is unique for each request datagram 3 transmitted from the licensee, except for retransmitted datagrams. This allows a reply datagram 3 received by a licensee to be verified as an actual reply to a request datagram 3 from that licensee, as explained below.

Number of processes running 26 is the number of concurrent uses of product 1 at the time datagram 3 is sent. Authorization code 27 is used on reply datagrams 3 to indicate an approval or a denial. Message text 28 contains a message which will be displayed to the user upon a denial.

License database 29 at the licensor's site holds records of information about customers, licenses, and license usage. The types of information within license database 29 of the present embodiment are shown in FIG. 2. However, a specific license management system may require its license database to hold types of information other than those in FIG. 2. For example, licensee name and address may be incorporated as a part of a license database 29.

License record 5 contains information on licenses. Licensee network address 30 identifies a precise network node which is licensed to use product 1. If request datagrams are received which do not originate from known licensee network addresses 30, reply datagrams containing denial messages are transmitted. Product model number 31 is the model number of a licensed product. Termination date 32 is the expiration date of a license. When the license of a product is issued for an unlimited duration, termination date 32 should reflect a date very far into the future, relative to the licensing date.

The present embodiment allows licenses to be paid for in a lease-like or rental fashion. If a licensee were to rent or lease product 1, paid through date 33 would reflect the date through which the licensee has paid for using the product. Grace period 34 is the time interval for which the licensee is allowed to be delinquent before services are disconnected. Grace period 34 would reflect a very large time interval if the license is not of a lease-like or rental type. When the license provides for a limit on the number of concurrent uses of a product 1, number of processes licensed 35 contains the limiting number. When the license does not provide for such a limit, number of processes 35 should be a very large number.

History of license datagrams 6 is an archive of datagrams 3 received from the licensee.

Figure 3:
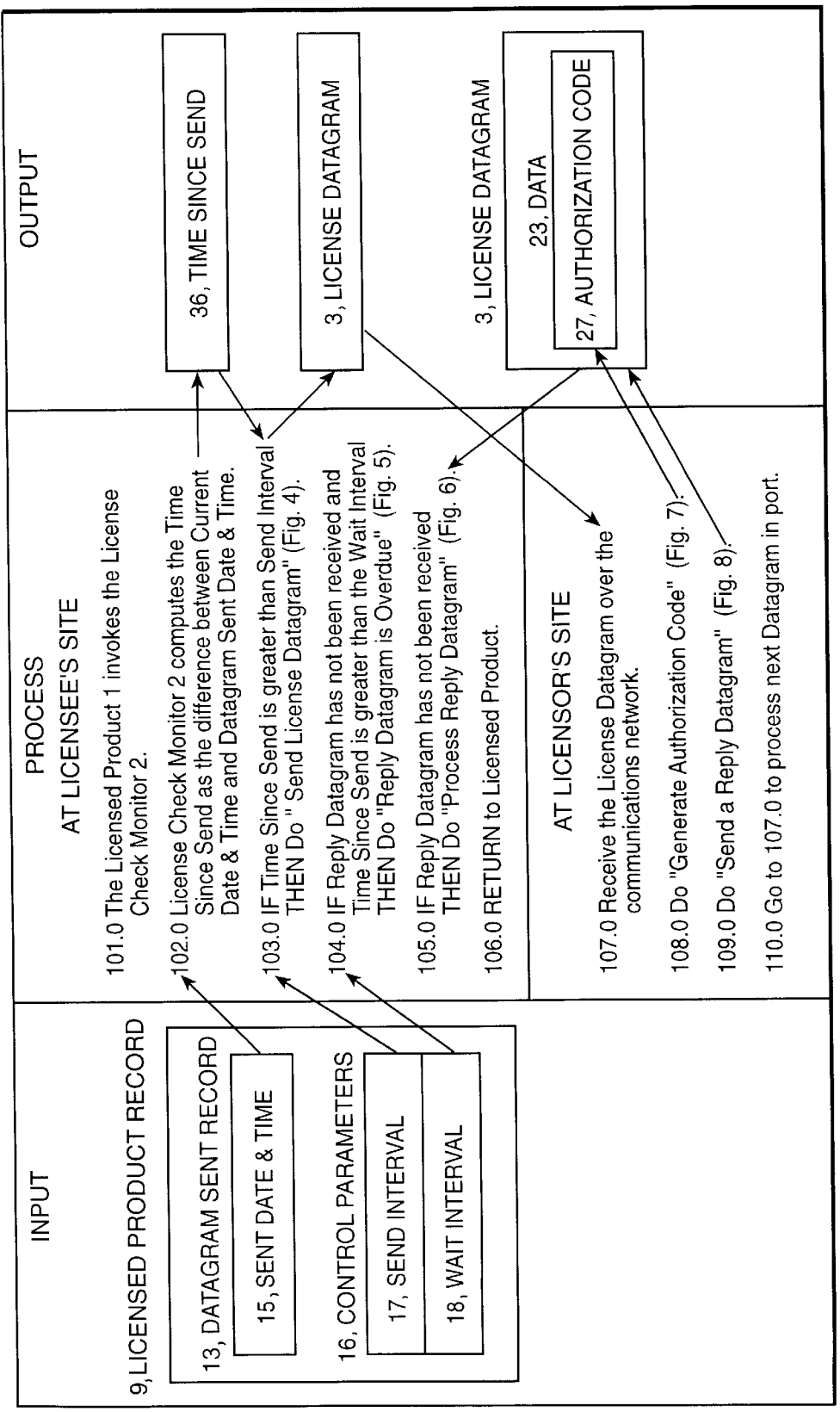
FIG. 3 illustrates a sequence of representative operations executed at the licensee's site and at the licensor's site, together with required inputs for the execution of the operations and with outputs produced therefrom.

FIG. 3 illustrates operations executed at the licensee's site and at the licensor's site. An overview of the processing at the licensee's site is described by steps 101.0 to 106.0, and an overview of the processing at the licensor's site is described by steps 107.0 to 110.0.

At the licensee's site, at step 101.0, product 1 invokes monitor 2. This is accomplished by first establishing monitor 2 as a handler for a timer expiration interrupt signal and for received datagrams 3. Next, a timer is set with a very short time to cause an initial call to monitor 2. At step 102.0, monitor 2 computes a time 36 since the last datagram was sent by determining the difference between the current date and sent time and date and time 15 that a datagram was last sent from the licensee's site. When product 1 commences execution, datagram sent date and time 15 is set to "null." Thus, time since send 36 is very large at the beginning of the monitor's execution. At step 103.0, time since send 36 is compared to send interval 17. If time since send 36 is greater than send interval 17, then a request datagram is transmitted, per the steps described in FIG. 4. Step 104.0 first checks if a reply to the last datagram has arrived and if wait interval 18 has expired. If a reply has not arrived and the wait interval has expired, steps 104.1–104.3 (FIG. 5) are executed. Step 105.0 processes authorization code 27 in a reply when the reply is received, in accordance with steps 105.1 to 105.5 (FIG. 6). At step 106.0, product 1 resumes normal execution of its programs until the next interrupt signal is generated.

Figure 7:
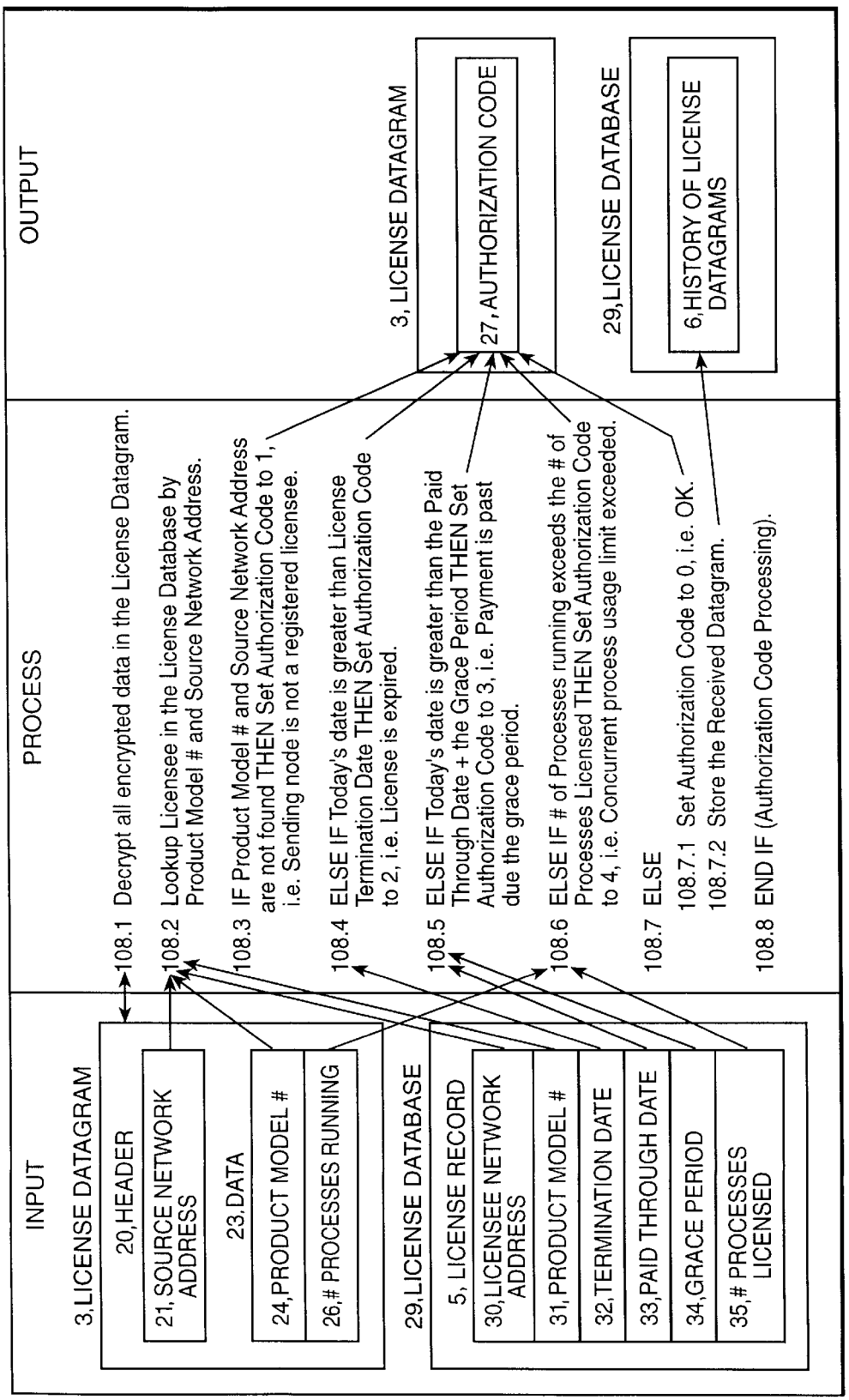
FIG. 7 shows a sequence of representative operations to generate an authorization code, together with required inputs for the execution of the operations and with outputs produced therefrom.
Figure 8:
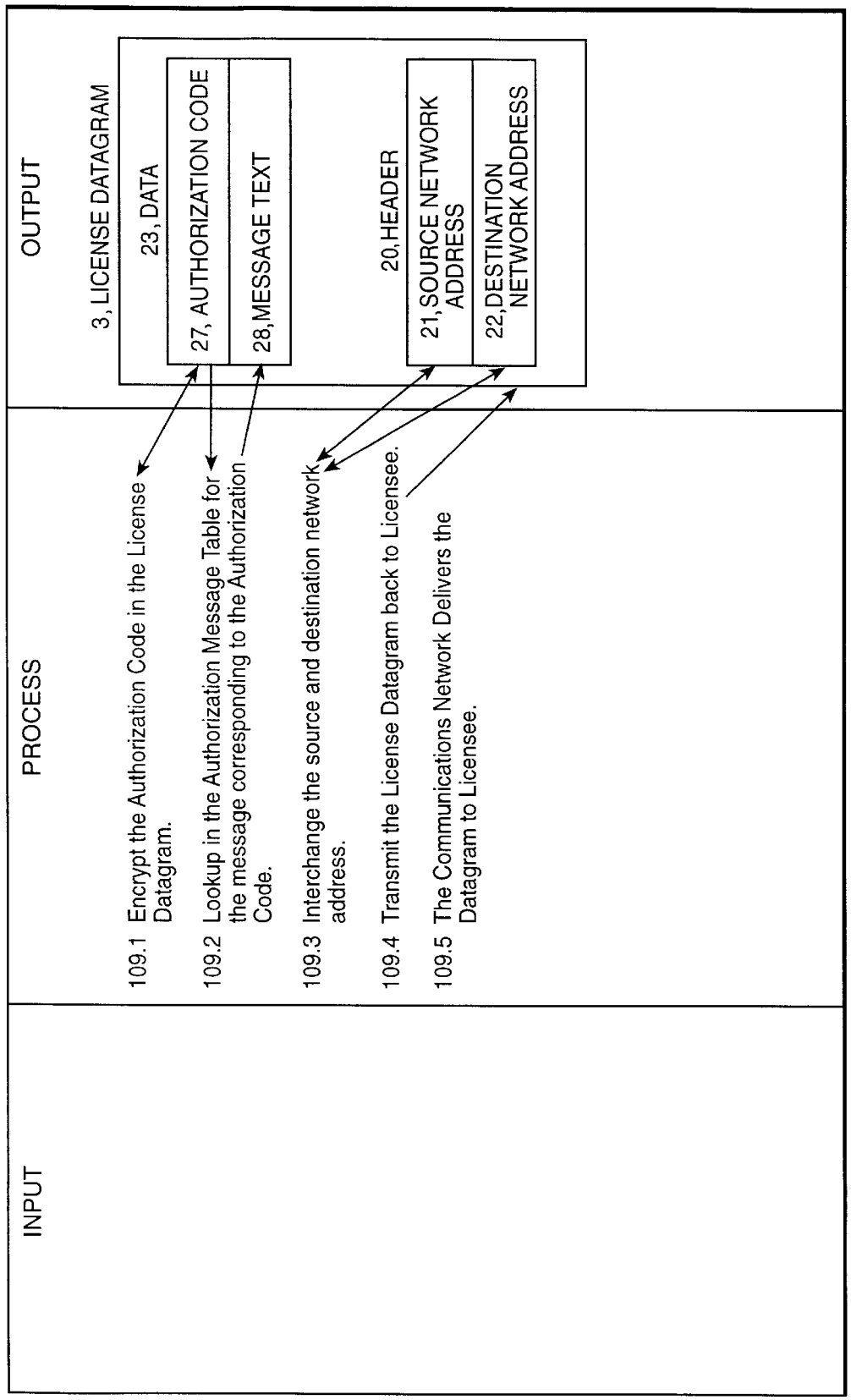
FIG. 8 shows a sequence of representative operations to send a reply datagram, together with required inputs for the execution of the operations and with outputs produced therefrom.

At the licensor's site, license control system 4 receives and processes datagram 3, in accordance with steps 107.0 to 110.0. Step 107.0 receives request datagram 3. Step 108.0 generates authorization code 27, per steps 108.1 to 108.8 (FIG. 7). Step 109.0 creates reply datagram 3 and transmits the datagram to the licensee via steps 109.1 to 109.5 (FIG. 8).

Figure 4:
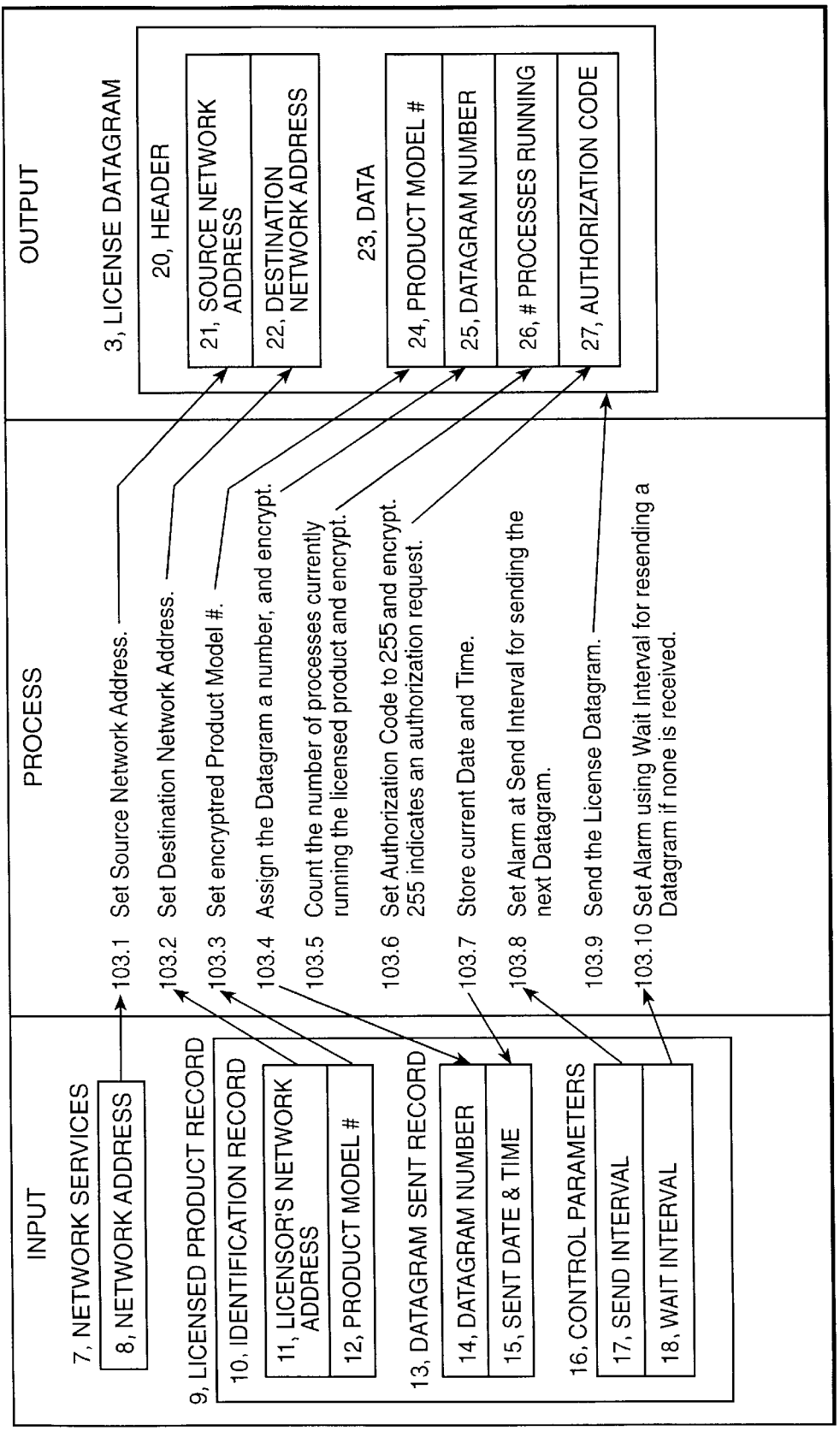
FIG. 4 illustrates a sequence of representative operations to send a request datagram, together with required inputs for the execution of the operations and with outputs produced therefrom.

FIG. 4 shows the procedure which monitor 2 follows for sending request datagram 3 to the licensor. Step 103.1 sets source network address 21 in datagram 3 to the network address 8 of the licensee's location on the network. Step 103.2 sets destination network address 22 to licensor's network address 11. Step 103.3 encrypts product model number 12 for datagram 3. Step 103.4 assigns a unique number to datagram 3, encrypts the number, and stores it as datagram number 14. This number is altered when an entirely new datagram 3 is sent. Datagrams which are retransmitted have the same datagram number 25 as the original. As already explained, this allows license control system 4 to identify duplicate datagrams.

Step 103.5 counts the number of processes using product 1, currently running, encrypts the count, and stores the encryption as the number of processes running 26. In the UNIX operating system, this procedure could be performed using the command "ps" to obtain a list of current processes, the command "grep" to extract the processes of product 1, and "wc" to count the number of processes. Step 103.6 sets authorization code 27 to number 255 and encrypts the number.

Number 255 indicates that datagram 3 is a request for authorization. Such an indication is needed to guard the present system against the following steps for circumventing the present invention: intercepting outgoing datagrams; and inputting the intercepted datagrams to monitor 2.

Step 103.7 stores the current date and time as sent date & time 15. This date is needed to compute when to send the next datagram 3. Step 103.8 assigns a value to send interval 17, which sets an alarm for invoking monitor 2 to send the next datagram 3. Step 103.9 sends datagram 3.

In the present embodiment a datagram is transmitted via a connectionless datagram service. Methods for transmission are well documented for some networking systems. For example, TCP/IP (Transport Control Protocol/Internet Protocol) includes a connectionless protocol called UDP (User Datagram Protocol). A method for sending a datagram using UDP protocol from a SUN Microsystem computer is documented in a SUN manual titled, *Network Programming Guide*, in section 9 titled "Transport Level Interface Programming."

Step 103.10 sets another alarm using wait interval 18 for retransmitting datagram 3, if no reply datagram has been received. The alarm causes monitor 2 to be invoked for checking whether a reply datagram 3 has been received. Monitor 2 will transmit a duplicate of the previously transmitted datagram, if no reply has been received. After the execution of step 103.10, "Send License Datagram" procedure returns system control to step 104.0 in FIG. 3.

Figure 5:
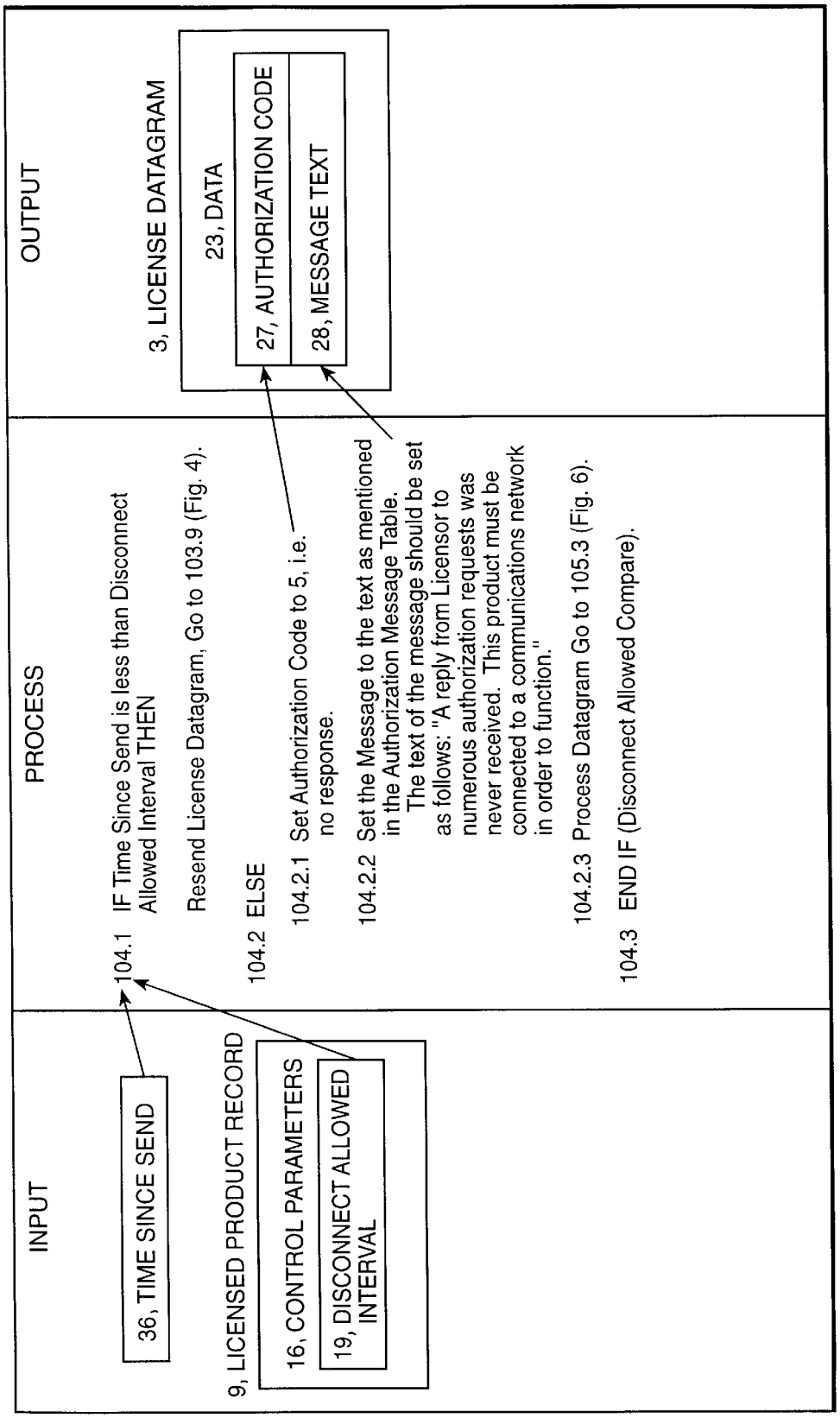
FIG. 5 illustrates a sequence of representative operations when a reply datagram is overdue, together with required inputs for the execution of the operations and with outputs produced therefrom.
Figure 6:
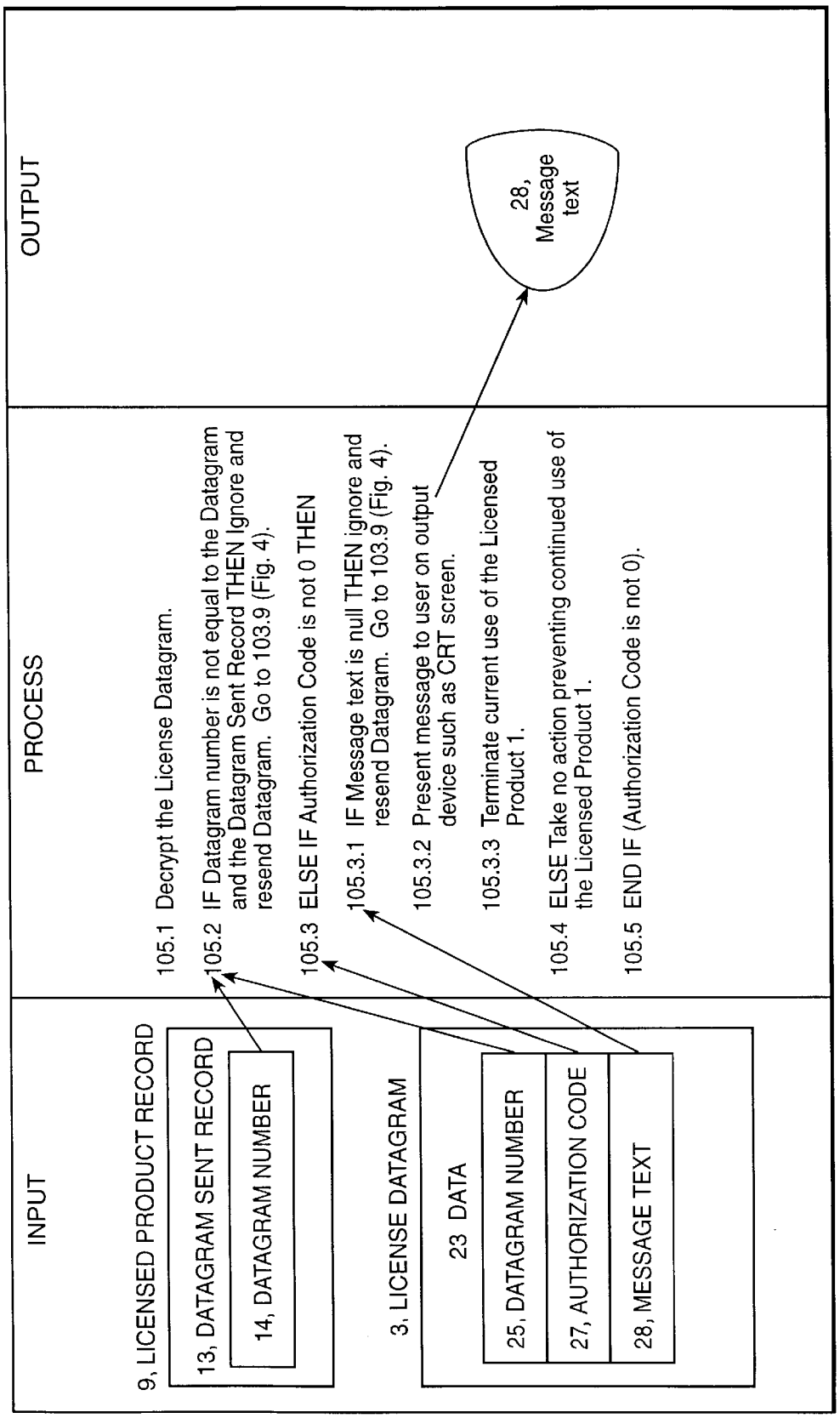
FIG. 6 shows a sequence of representative operations to process a reply datagram, together with required inputs for the execution of the operations and with outputs produced therefrom.

FIG. 5 shows the operation of the "Reply Datagram is Overdue" procedure. Step 104.1 compares time since the last datagram was sent 36 to disconnect allowed interval 19, which, as described above, is the interval that product 1 is allowed to operate even if a reply is overdue. If time since send 36 is smaller than disconnect allowed interval 19, datagram 3 is retransmitted via executing step 103.9 in FIG. 4. Step 104.2 "disconnects" product 1 from further service, if time since send 36 is greater than disconnect allowed interval 19.

Step 104.2 comprises a sequence of sub-steps 104.2.1–104.2.3. Step 104.2.1 assigns number 5 to authorization code 27 in the current datagram being processed. Value 5 is interpreted by monitor 2 as a denial. Step 104.2.2 sets message text 28 to the following: "A reply from licensor to numerous authorization requests was never received. This product must be connected to a communications network in order to function." Step 104.2.3 transfers system control to step 105.3 in FIG. 6. Step 105.3 processes the current denial datagram 3 as if it were just received.

Through the execution of steps 104.1–104.3, the present system permits the use of product 1 for a prescribed period of time. After the prescribed period of time has elapsed, the present system generates a denial.

FIG. 6 illustrates the steps which monitor 2 follows in processing a reply datagram 3. Step 105.1 decrypts all encrypted data in the received datagram. Step 105.2 compares datagram number 25 with datagram number 14 associated with the last datagram. If datagram number 25 is not equal to datagram number 14, step 105.2 ignores the current datagram and transfers procedural control to step 103.9 (FIG. 4) in order to resend the last transmitted datagram. After disconnect allowed interval 19 elapses, monitor 2 generates a denial.

In essence, step 105.2 guards against the circumvention of the present invention via: (1) intercepting a reply datagram 3 (from the licensor) containing an approval (2) storing the reply datagram 3; and (3) inputting the stored datagram to monitor 2.

If the execution of step 105.2 does not transfer its procedural control to step 105.3, and if authorization control 27 is not zero (indicating an unqualified authorization has not been received), step 105.3 processes authorization code 27 via steps 105.3.1 to 105.3.3. Step 105.3.1 retrieves message text 28 from datagram 3. If message text 28 is null, then the current datagram 3 is ignored, and monitor 2 resends the last transmitted datagram 3. Step 105.3.1 further protects the present system from attempts to generate fake datagrams and to feed the fake datagrams to monitor 2 by checking for a proper authorization code of zero.

If message text 28 is not null, step 105.3.2 presents the message 28 to the user on an output device such as a CRT screen. Step 105.3.3 terminates the current use of product 1. This step may be implemented by subroutine or function call to a simple exit that saves any current user data to a file. Alternatively, product 1 may be designed so that, upon being directed to terminate further execution, it first gives the user an opportunity to save their data.

If authorization code 27 is zero, step 105.4 allows further use of product 1. Step 105.5 returns procedural control to 106.0 on FIG. 3.

FIG. 7 shows a sequence of operations within the "Generate Authorization Code" procedure. The procedure produces appropriate authorization code 27 when a request datagram 3 is received at the licensor's site.

Step 108.1 decrypts all encrypted data in the received datagram 3. Using source network address 21 and product model number 24 in the datagram 3, step 108.2 searches the license database 29 for matching licensee network address 30 and product model number 31. If license database 29 does not contain a record of product model number 24 of the product 1 being licensed to the licensee, step 108.3 sets authorization code 27 of its reply datagram 3 to 1 (i.e., the sending node is not a registered address) and authorization is denied.

Step 108.3 prevents copies of product 1 from being installed on multiple nodes independently of whether they are within or outside the licensee's organization. Step 108.3 also prevents the licensee from transporting product 1 from one node to another node without the licensor's approval. This is important because the two nodes may have different processing capacities, and they may be billable at different rates.

If the date a request datagram is received is later than license termination date 32, step 108.4 sets authorization code 27 to number 2 (i.e., license has expired). Step 108.4 allows the licensor to fix licensing periods, or to determine free trial periods for the use of the product. The licensing period may be extended by resetting license termination date 32 at the licensor's site.

If the date when the datagram is received is later than the paid through date 33 as extended by the grace period 34, step 108.5 sets authorization code 27 to 3 (i.e., payment is past due).

If the number of processes running 26 exceeds a licensed number of concurrent uses of product 1 (at a particular node), then step 108.6 sets authorization code 27 to 4 (i.e. concurrent process usage limit is exceeded).

Step 108.7 sets authorization code 27 to 0 indicating processing can continue. It is noted that steps 108.3–108.7 are a part of a IF (x1) then (y1)
ELSE if (x2) then (y2)
ELSE if (x3) then (y3)

statement of a procedure (e.g., FORTRAN, PASCAL, C, etc). Thus, only one of the steps 108.3–108.7 is executed. Step 108.7 sets authorization code 27 to 0 (indicating approval of further use) only if steps 108.3–108.6 do not execute the THEN portion of each step. Step 108.7 also stores the received datagram 3 in history of license datagrams 6.

Step 108.8 is the last of authorization processing rules 108.1–108.7. After the execution of steps 108.3–108.7, step 108.8 returns procedural control to step 109.0 in FIG. 3.

FIG. 8 illustrates the steps which license control system 4 follows to send reply datagram 3 to the licensee.

Step 109.1 encrypts authorization code 27 and writes the encrypted code into datagram 3. Next, step 109.2 writes message text 28 corresponding to authorization code 27 into datagram 3.

Step 109.2 may be replaced with the following method for relaying proper messages to a product user. Proper messages corresponding to each authorization code is stored in monitor 2 at each licensee's site. Upon reception of a reply datagram 3, monitor 2 would locate within itself the proper message corresponding to the authorization code, and use the message for various purposes. This method would reduce the size of reply datagrams 3. However, if the licensor wanted to implement new denial codes, each product would need to somehow incorporate the new message associated with the new denial code into itself. The list of messages, one of which may be written as message text 28, are as follows:

| AUTHORIZATION CODE | TEXT MESSAGE |
|---|---|
| 1 | This product is not licensed to run at this location. Please contact the licensor to either license this product, or move an existing license of your organization to this location. Use of this product at this location is discontinued until this problem is resolved. |
| 2 | Your license on this product has expired. Please contact licensor in order to have your license extended. Use of this product is discontinued until this problem is resolved. |
| 3 | Payment on this licensed product |

-continued

| AUTHORIZATION CODE | TEXT MESSAGE |
|---|---|
| | is over due and past your grace period. Please have your accounting department send payment in order to continue your license. Use of this product is discontinued until this problem is resolved. |
| 4 | Your current use of this licensed product exceeds limits for the number of uses your organization has licensed. Please try again later. |
| 5 | A reply from licensor to numerous authorization requests was never received. This product must be connected to a communications network in order to function. |
| 0 | Authorization is OK. There is no message. |

Step 109.3 swaps source network address 21 and destination network address 22. Step 109.4 transmits datagram 3 back to monitor 2.

At step 109.5, a communications network delivers datagram 3 to monitor 2. Subsequently, procedural control returns to step 107.0 in FIG. 3 to process the next datagram 3.

Although only a few exemplary embodiments of this invention have been described in detail above, those skilled in the art will readily appreciate that many modifications are possible in the preferred embodiments without materially departing from the novel teachings and advantages of this invention. For example, product 1 was described as sometimes consisting of information as well as software which controls the information. This approach provides the greatest flexibility, but it is also possible to include the software which controls the information in the networked machine at the licensee's site. In this case, product 1 is split, with part of it on media and part on the licensee's machine. By doing this, some space can be saved on the media containing product 1, but the capabilities of these products will be limited by the standard functions available on these machines.

Also, the presently described embodiment includes a product 1 which is at the licensee's site. This implies that product 1 is on some physical media such as diskette, tape, or CD. However, product 1 can be electronically delivered over communications lines to the licensee and therefore might exist in the memory of the licensee's machine, rather than any physical media. In the case of a product such as music, radio programs and the like, product 1 may even be broadcast to the licensee's site for playback; thus, the product 1 would not even be "resident" in the licensee's machine.

The presently described embodiment allows the licensee to access the licensed product concurrent with the sending and receiving of datagram 3. In this way, the present invention does not inconvenience the legitimate licensee; however, for sensitive licensed products such as confidential information, the license check monitor 2 can prevent access to the product 1 until an authorization reply datagram 3 is received.

Further, monitor 2 could be realized as an integral part of product 1. Monitor 2 could also be implemented as: 1) a separate process which is the parent process of product 1 (Such a parent process would have the authority to cancel the use of product 1); 2) a single system level task which controls license checking of all products at the licensee's site; and 3) custom logic in a digital integrated circuit (the present invention could be implemented as hardware instead of software).

Also, though the above embodiment has been described as being implemented on a computer system network where operator messages are provided on a CRT monitor or the like, the invention may be practiced on other hardware platforms by incorporating appropriate changes known to those of ordinary skill in the art. For example, in an alternative hardware embodiment such as a music or video playback device, monitor 2 is invoked by the licensee's action of pushing the "play" or similar button, and in a broadcast music application or similar system, the monitor may be invoked simply by turning the device on. The processing of monitor 2 is as described in the presently described embodiment. However, when a denial message is received or generated, monitor 2 must be able to switch "play" to "off".

The presently described embodiment is designed to be used in conjunction with a connectionless UDP (User Datagram Protocol) in the TCP/IP protocol suite as an underlying protocol. However, the present invention could also be realized using a slower, connectionless protocol such as electronic mail or a variety of connection protocols (e.g., File Transfer Protocols (FTP), Telnet).

It is noted that protocol suites quite different from TCP/IP could be used, such as ISO (International Standards Organization) protocol. In addition, datagrams 3 could be sent over telephone systems with communications protocols such as those specified by CCITT (Consultative Committee on International Telephony and Telegraphy). In this case, telephone numbers could serve as network addresses 21, 22. Communications protocols for wireless communications such as cellular telephone can also be used to send the datagram 3.

Accordingly, all such modifications are intended to be included within the scope of this invention as defined by the following claims.

What is claimed is:

1. A method for monitoring the use of a licensed product at at least one licensee's site, the method comprising the steps of:

generating datagrams at regular time intervals from at least one licensee's site with a device using said licensed product;

including in each of said datagrams an address of said licensee on a communications facility, said address being designated by said communications facility without any data being provided by said licensee;

sending said datagrams including said address from said licensee's site over said communications facility to a licensor's site at regular time intervals while said licensed product is in use;

receiving said datagrams at said licensor's site using a license control system;

storing in said license control system an indication of receipt of each of said datagrams; and counting said datagrams from each licensee, using said license control system, as an indication of the use by the licensee of said licensed product.

2. A method as in claim 1, wherein:

said generating step includes the step of incorporating a model number of said licensed product in said datagrams; and said counting step includes the step of separately counting datagrams for each product model number for each licensee.

3. A method for controlling use of a licensed product at at least one licensee's site, the method comprising the steps of:

generating a request datagram from at least one licensee's site with a device using said licensed product, said request datagrams including an address of the licensee on a communications facility;

first sending said request datagram including said address of said licensee from said licensee's site over said communications facility to a licensor's site while said licensed product is in use;

first receiving said request datagram at said licensor's site using a license control system;

comparing said request datagram with rules and license data using said license control system at said licensor's site to determine if use by said licensee of said licensed product is authorized, said license control system using said address in said request datagram to identify said licensee;

second sending, via said communications facility, a reply authorizing datagram to said address specified in said request datagram using said license control system, if use of said licensed product is approved; and second receiving said reply authorizing datagram at said address and authorizing use of said licensed product for a predetermined period of time, and denying the use of said licensed product when no reply authorizing datagram is received.

4. A method as in claim 3, wherein:

said generating step includes the step of incorporating a model number of said licensed product in said request datagram;

said comparing step includes the step of comparing said rules and license data for a particular model number; and said second sending step includes the step of transmitting said reply authorizing datagram for each product model number if use of said licensed product is approved.

5. A method as in claim 3, wherein:

said generating step includes the step of obtaining said address of said licensee from said communications facility without any data being provided by said licensee.

6. A method as in claim 3, further comprising the step of third sending to said address, via said communications facility, a reply denial datagram using said license control system if use of said licensed product is not approved as determined in said comparing step, said first sending step including the step of resending said request datagram including said address if neither a reply authorizing datagram nor a reply denial datagram is received from said licensor's site within a predetermined time from sending said request datagram including said address.

7. A method as in claim 3, wherein:

said first sending step includes the step of sending a request datagram at regular time intervals.

8. A method as in claim 3, wherein:

said generating step includes the step of providing a datagram identification code within said request datagram;

said second sending step includes the step of inserting said datagram identification code in said reply authorizing datagram; and said second receiving step includes the step of rejecting said reply authorizing datagram if said datagram identification code included in said reply authorizing datagram does not match said datagram identification code included in said request datagram.

9. A method as in claim 3, wherein:

said comparing step includes the step of comparing said address designating said licensee with a list of licensee addresses to determine if said address is on said list; and said second sending step prohibits sending said reply authorizing datagram if said address designating said licensee is not on said list.

10. A method as in claim 9 further comprising the step of third sending a reply denial datagram if said facility address that identifies said licensee is not on said list.

11. A method as in claim 3, wherein:

said comparing step includes the step of comparing a license expiration date with a date at which said request datagram is received; and said second sending step prohibits sending said reply authorizing datagram if the license expiration date is earlier than the date at which said request datagram is received.

12. A method as in claim 11, further comprising the step of third sending a reply denial datagram if the license expiration date is earlier than the date at which said datagram is received.

13. A method as in claim 3, wherein:

said comparing step includes the step of checking currentness of payments from said license; and said second sending step prohibits sending said reply authorizing datagram if payment is overdue.

14. A method as in claim 13, further comprising the step of third sending a reply denial datagram if payment is overdue.

15. A method as in claim 3, wherein:

said generating step includes the step of incorporating in said request datagram data indicative of the number of processes currently using said licensed product at said licensee's site;

said comparing step includes the step of comparing said number of processes using said licensed product at said licensee's site to an authorized number; and said second sending step prohibits sending said reply authorizing datagram if said number of processes using said licensed product exceeds said authorized number.

16. A method as in claim 15, further comprising the step of third sending a reply denial datagram if said number of processes using said licensed product exceeds said authorized number.

17. A method as in claim 3, wherein:

said second sending step includes the steps of sending said reply authorizing datagram when use of said licensed product is approved and sending a reply denial datagram when use of said licensed product is not approved, said second receiving step denying use of said licensed product when said reply denial datagram is received.

18. A method as in claim 17, wherein:

said receiving and denying step denies use of said licensed product when neither a reply authorizing datagram nor a reply denial datagram is received within a predetermined time after said request datagram is sent.

19. A method as in claim 17, further comprising the step of indicating, at a licensee's site, a reason for denial when said reply denial datagram is received.

20. A method as in claim 3, wherein:

said licensed product comprises an executable portion and a data portion; and said method further comprises a step of controlling use of said data portion with said executable portion.

21. A method as in claim 3 further comprising a step of allowing use of said licensed product before a reply datagram is received.

22. A system for controlling use of a licensed product comprising:

a communications facility which delivers and receives datagrams, and to which at least one licensee having a license for operating a licensed product from a licensor is connected, said licensed product having an executable portion and a data portion;

monitoring means, connected to said communications facility at a site of each licensee, for generating a request datagram including an address of said licensee on said communications facility, for transmitting said request datagram including said address over said communications facility to a site of said licensor, and for receiving and processing a reply datagram;

controlling means, connected to said communications facility at said licensor's site, for receiving said request datagram, comparing said request datagram with rules and license data to determine if use of said licensed product is authorized, said controlling means using said address included in said request datagram to identify said licensee, and sending, via said communications facility, a reply authorizing datagram to said address if use of said licensed product is approved; and means for controlling use of said data portion with said executable portion;

wherein said monitoring means includes means for denying use of said licensed product when no reply authorizing datagram is received.

23. A system as in claim 22, wherein:

said monitoring means sends request datagrams at regular time intervals during use of said licensed product; and said controlling means further comprises means for counting said request datagrams received at said controlling means and means for computing an amount to be billed to said licensee in response to said counting.

24. A system as in claim 22, wherein:

said monitoring means incorporates a model number for said licensed product in said request datagram; and said controlling means comprises means for counting request datagrams for each product model number for each licensee, in order to compute an amount to be billed to each licensee.

25. A system as in claim 22, wherein:

said monitoring means obtains said address of said licensee from said communications facility without any input from said licensee.

26. A system as in claim 22, wherein:

said controlling means sends a reply denial datagram to said address if use of said licensed product is not approved; and said monitoring means resends said request datagram if no reply authorizing datagram and no reply denial datagram is received within a predetermined period of time after said requesting datagram is sent.

27. A system as in claim 22, wherein:

said monitoring means transmits request datagrams at predetermined time intervals.

28. A system as in claim 22, wherein:

said monitoring means incorporates a unique identification code in said request datagram;

said controlling means incorporates said identification code in said reply authorizing datagram; and said monitoring means rejects any reply authorizing datagram which does not include said identification code as included in said request datagram.

29. A system as in claim 22, wherein:

said controlling means compares said address of said licensee with a list of licensee addresses and does not generate a reply authorizing datagram if said address of said licensee is not on said list.

30. A system as in claim 29, wherein:

said controlling means sends a reply denial datagram when said facility address is not on said list.

31. A system as in claim 22, wherein:

said controlling means compares an expiration date of a license of said licensed product with a date at which said request datagram is received by said controlling means, and does not generate a reply authorizing datagram, thus denying use of said licensed product, if the license expiration date is earlier than the date at which said request datagram is received.

32. A system as in claim 31, wherein:

said controlling means sends a reply denial datagram if the license expiration date is earlier than the date at which said request datagram is received.

33. A system as in claim 22, wherein:

said controlling means generates a reply authorizing datagram, thus denying use of said licensed product, if a payment for the use of said licensed product is overdue.

34. A system as in claim 33, wherein:

said controlling means sends a reply denial datagram if payment for the use of said licensed product is overdue.

35. A system as in claim 32, wherein:

said monitoring means includes in said request datagram data indicative of the number of processes, at a licensee's site, currently using said licensed product; and said controlling means does not generate a reply authorizing datagram, thus denying a use of said licensed product, if more than a predetermined number of processes using said licensed product are running at the licensee's site.

36. A system as in claim 35, wherein:

said controlling means sends a reply denial datagram if more than said predetermined number of processes using said product are running at the licensee's site.

37. A system as in claim 22, wherein:

said controlling means sends a reply denial datagram if use of said licensed product is not approved.

38. A system as in claim 37, wherein:

said monitoring means denies use of said licensed product when no reply authorizing datagram and no reply denial datagram is received within a predetermined time from the sending of said request datagram.

39. A system as in claim 37, further comprising means for indicating, at a licensee's site, a reason for denial when said reply denial datagram is received.

40. A system as in claim 22, wherein:

said monitoring means includes means for permitting use of said licensed product before a reply datagram is received.

41. A system as in claim 22, wherein:
said data portion controlling means is disposed within said executable portion.

42. A system as in claim 22, wherein:
said data portion controlling means comprises a first partial controlling means disposed within said executable portion and a second partial controlling means disposed within said monitoring means.

43. A system for monitoring a licensed product comprising:
a communications facility which designates addresses to and from which said communications facility delivers and receives datagrams, and to which at least one licensee having a license for operating a licensed product from the licensor is connected, said licensee having an address designated by said communications facility;
monitoring means, connected to said communications facility at a site of each licensee, for generating datagrams including said address of said licensee, and for transmitting said datagrams including said address at periodic intervals over said communications facility to a site of said licensor; and
control means, connected to said communications facility at said licensor's site, for receiving said request datagrams at regular time intervals, storing an indication of receipt of each of said request datagrams and counting said request datagrams from each licensee as an indication of the use by the licensee of said licensed product.

44. A system as in claim 43, wherein:
said monitoring means obtains said address of said licensee from said communications facility without any input from said licensee.

45. A system as in claim 43, wherein:
said monitoring means incorporates a product model number in said request datagrams; and
said controlling means separately counts request datagrams for each product model number for each licensee.

46. A method for notifying a licensor of the use of a licensed product at at least one licensee's site, the method comprising the steps of:
generating datagrams at regular time intervals from at least one licensee's site with a device using said licensed product;
including in each of said datagrams an address of said licensee on a communications facility, said address being designated by said communications facility without any data being provided by said licensee; and
sending said datagrams including said address from said licensee's site over said communications facility to a licensor's site at regular time intervals while said licensed product is in use.

47. A method as in claim 46 wherein:
said generating step includes the step of incorporating a model number of said licensed product in said datagrams.

48. A method for controlling use of a licensed product at at least one licensee's site, the method comprising the steps of:
generating a request datagram from at least one licensee's site with a device using said licensed product, said request datagrams including an address of the licensee on a communications facility;
sending said request datagram including said address of said licensee from said licensee's site over said communications facility to a licensor's site while said licensed product is in use; and
receiving a reply datagram at said address and denying the use of said licensed product when no reply datagram is received.

49. A method as in claim 48 wherein:
said generating step includes the step of incorporating a model number of said licensed product in said datagram.

50. A method as in claim 48, wherein:
said generating step includes the step of obtaining said address of said licensee from said communications facility without any data being provided by said licensee.

51. A method as in claim 48, wherein:
said reply datagram is one of at least a reply authorization datagram and a reply denial datagram; and
said sending step includes a step of resending said request datagram if neither a reply authorizing datagram nor a reply denial datagram is received within a predetermined time from sending said request datagram including said address.

52. A method as in claim 48, wherein said sending step includes the step of sending a request datagram at regular time intervals.

53. A method as in claim 48, wherein:
said generating step includes the step of providing a datagram identification code within said request datagram; and
said receiving step includes the step of rejecting said reply datagram if said datagram identification code included in said reply datagram does not match said datagram identification code included in said request datagram.

54. A method as in claim 48, wherein:
said generating step includes the step of incorporating, in said request datagram, data indicative of the number of processes currently using said licensed product at said licensee's site.

55. A method as in claim 48, further comprising the steps of:
receiving a reply denial datagram; and
displaying, at a licensee's site, a reason for denial when said reply denial datagram is received.

56. A method as in claim 48, wherein:
said licensed product comprises an executable portion and a data portion; and
said method further comprises a step of controlling use of said data portion with said executable portion.

57. A method as in claim 48 further comprising a step of allowing use of said licensed product before a reply datagram is received.

58. A system for controlling use of a licensed product comprising:
a communications facility which delivers and receives datagrams, and to which at least one licensee having a license for operating a licensed product from a licensor is connected, said licensed product including an executable portion and a data portion;
monitoring means, connected to said communications facility at a site of each licensee, for generating a request datagram including an address of said licensee on said communications facility, for transmitting said request datagram including said address over said communications facility to a site of said licensor; for receiving and processing a reply datagram; and for denying use of said licensed product when no reply datagram is received; and means for controlling use of said data portion with said executable portion.

59. A system as in claim 58, wherein:

said monitoring means sends request datagrams at regular time intervals during use of said licensed product.

60. A system as in claim 58 wherein:

said monitoring means incorporates a model number for said licensed product in said request datagram.

61. A system as in claim 58, wherein said monitoring means obtains said facility address of said licensee from said communications facility without any input from said licensee.

62. A system as in claim 58, wherein:

said monitoring means resends said request datagram if no reply authorizing datagram and no reply denial datagram is received within a predetermined period of time after said requesting datagram is sent.

63. A system as in claim 58, wherein said monitoring means transmits request datagrams at predetermined time intervals.

64. A system as in claim 58, wherein:

said monitoring means incorporates a unique identification code in said request datagram; and said monitoring means rejects any reply authorizing datagram which does not include the same identification code as included in said request datagram.

65. A system as in claim 58, wherein:

said monitoring means includes, in said request datagram, data indicative of the number of processes at a licensee's site currently using said licensed product.

66. A system as in claim 58, wherein:

said monitoring means denies use of said licensed product when no reply authorizing datagram and no reply denial datagram is received within a predetermined time from the sending of said request datagram.

67. A system as in claim 58, further comprising means for indicating, at a licensee's site, a reason for denial when a reply denial datagram is received.

68. A system as in claim 58, wherein said data portion controlling means is disposed within said executable portion.

69. A system as in claim 58, wherein said data portion controlling means comprises a first partial controlling means disposed within said executable portion and a second partial controlling means disposed within said monitoring means.

70. A system as in claim 58, wherein said monitoring means includes means for permitting use of said licensed product before a reply datagram is received.

71. A system for notifying a licensor of use of a licensed product comprising:

a communications facility which designates addresses to and from which said communications facility delivers and receives datagrams, and to which at least one licensee having a license for operating a licensed product from the licensor is connected, said licensee having an address designated by said communications facility; and monitoring means, connected to said communications facility at a site of each licensee, for generating datagrams including said address of said licensee, and for transmitting said datagrams including said address at periodic intervals over said communications facility to a site of said licensor.

72. A system as in claim 71, wherein said monitoring means obtains said address of said licensee from said communications facility without any input from said licensee.

73. A system as in claim 71, wherein:

said monitoring means incorporates a product model number in said request datagrams.

74. A method for monitoring the use of a licensed product at at least one licensee's site, the method comprising the steps of:

receiving datagrams at regular time intervals at a licensor's site using a license control system, said licensor's site being connected to a communications facility having at least one licensee's site connected thereto, said datagrams being generated at regular time intervals and including a facility address designated by the communications facility without any data being provided by said licensee which identifies a licensee connected to said communications facility;

storing in said license control system an indication of receipt of each of said datagrams; and counting said datagrams from each licensee, using said licensee control system, as an indication of the use of said licensed product.

75. A method as in claim 74 further wherein:

said datagrams include a model number of each licensed product; and said counting step includes the step of separately counting datagrams for each product model number for each licensee.

76. A method for controlling use of a licensed product at at least one licensee's site, the method comprising the steps of:

receiving a request datagram at a licensor's site using a license control system, said licensor's site being connected to a communications facility having at least one licensee's site connected thereto, said request datagram including an address of the licensee on the communications facility and being sent over said communications facility to said licensor's site while said licensed product is in use;

comparing said received request datagram with rules and license data using said license control system at said licensor's site to determine if use by said licensee of said licensed product is authorized, said license control system using said address in said request datagram to identify said licensee; and sending, via said communications facility, a reply authorizing datagram to said address specified in said request datagram using said license control system if use of said licensed product is approved.

77. A method as in claim 76 wherein:

said request datagrams include a model number of said licensed product;

said comparing step includes the step of comparing said rules and license data for a particular model number; and said sending step includes the step of transmitting said reply authorizing datagram for each product model number.

78. A method as in claim 76 further comprising the step of sending a reply denial datagram if use of said licensed product is not approved as determined in said comparing step.

79. A method as in claim 76, wherein:

said request datagrams include a datagram identification code; and said sending step includes the step of inserting the same datagram identification code in said reply authorizing datagram.

80. A method as in claim 76, wherein:

said comparing step includes the step of comparing said address that identifies said licensee with a list of licensee addresses to determine if said facility address is on said list; and said reply authorizing datagram is not sent if said address that identifies said licensee is not on said list.

81. A method as in claim 80 further comprising the step of sending a reply denial datagram if said facility address that identifies said licensee is not on said list.

82. A method as in claim 76, wherein:

said comparing step includes the step of comparing a license expiration date with a date at which said request datagram is received; and said sending step includes the step of prohibiting the sending of said reply authorizing datagram if the license expiration date is earlier than the date at which said request datagram is received.

83. A method as in claim 82, further comprising the step of sending a reply denial datagram if the license expiration date is earlier than the date at which said request datagram is received.

84. A method as in claim 76, wherein:

said comparing step includes the step of checking currentness of payments from said license; and said sending step includes the step of prohibiting the sending of said reply authorizing datagram if payment is overdue.

85. A method as in claim 84, further comprising the step of sending a reply denial datagram if payment is overdue.

86. A method as in claim 76, wherein:

said datagrams include data indicative of the number of processes currently using said licensed product at said licensee's site;

said comparing step includes the step of comparing said number of processes using said licensed product to an authorized number; and said sending step includes the step of prohibiting the sending of said reply authorizing datagram if said number of processes using said product exceeds said authorized number.

87. A method as in claim 86, further comprising the step of sending a reply denial datagram if said number of processes using said product exceeds said authorized number.

88. A method as in claim 76, wherein said sending step includes the steps of sending said reply authorizing datagram when use of said licensed product is approved and sending a reply denial datagram when use of said product is not approved.

89. A system for controlling use of a licensed product comprising:

a communications facility which delivers and receives datagrams, and to which at least one licensee having a license for operating a licensed product from a licensor is connected, said licensed product including an executable portion and a data portion;

controlling means, connected to said communications facility at said licensor's site, for receiving a request datagram, said request datagram including an address of said licensee on said communications facility and being transmitted with said address over said communications facility to a site of said licensor; comparing said request datagram with rules and license data to determine if use of said licensed product is authorized, said controlling means using said address included in said request datagram to identify said licensee; and sending, via said communications facility, a reply authorizing datagram to said address if use of said licensed product is approved; and means for controlling use of said data portion with said executable portion.

90. A system as in claim 89, wherein:

said request datagrams are sent at regular time intervals during use of said licensed product; and said controlling means comprises means for counting said request datagrams received at said controlling means and means for computing an amount to be billed to said licensee in response to said counting.

91. A system as in claim 89 wherein:

said request datagrams include a model number for said licensed product; and said controlling means comprises means for counting request datagrams for each product model number for each licensee, in order to compute an amount to be billed to each licensee.

92. A system as in claim 89, wherein:

said controlling means sends a reply denial datagram to said licensee's site if use of said licensed product is not approved.

93. A system as in claim 89, wherein:

said request datagrams include a unique identification code; and said controlling means incorporates the same request datagram identification code in said reply authorizing datagram.

94. A system as in claim 89, wherein said controlling means compares said address of said licensee with a list of licensee addresses and does not generate a reply authorizing datagram if said address of said licensee is not on said list.

95. A system as in claim 94, wherein said controlling means sends a reply denial datagram when said address is not on said list.

96. A system as in claim 89, wherein said controlling means compares an expiration date of a license of said licensed product with a date at which said request datagram is received by said controlling means, and does not generate a reply authorizing datagram, thus denying use of said licensed product, if the license expiration date is earlier than the date at which said request datagram is received.

97. A system as in claim 96, wherein said controlling means sends a reply denial datagram if the license expiration date is earlier than the date at which said request datagram is received.

98. A system as in claim 89, wherein said controlling means generates a reply authorizing datagram, thus denying use of said product, if a payment for the use of said licensed product is overdue.

99. A system as in claim 98, wherein said controlling means sends a reply denial datagram if payment for the use of said licensed product is overdue.

100. A system as in claim 89, wherein:

said request datagrams include data indicative of the number of processes, at a licensee's site, currently using said licensed product; and said controlling means does not generate a reply authorizing datagram, thus denying a use of said licensed product, if more than a predetermined number of processes using said licensed product are running at the licensee's site.

101. A system as in claim 100, wherein said controlling means sends a reply denial datagram if more than said predetermined number of processes using said licensed product are running at the licensee's site.

102. A system as in claim 89, wherein said controlling means sends a reply denial datagram if use of said licensed product is not approved.

103. A system as in claim 89, wherein said data portion controlling means is disposed within said executable portion.

104. A system for monitoring a licensed product comprising:

a communications facility which designates addresses to and from which said communications facility delivers and receives datagrams, and to which at least one licensee having a license for operating a licensed product from the licensor is connected, said licensee having an address designated by said communications facility; and control means, connected to said communications facility at a licensor's site, for: receiving request datagrams, said request datagrams including an address of said licensee on said communications facility and being transmitted at periodic intervals over said communications facility to said licensor's site; storing an indication of receipt of each of said request datagrams; and counting said request datagrams from each licensee as an indication of the use by the licensee of said licensed product.

105. A system as in claim 104, wherein:

said request datagrams include a product model number; and said controlling means separately counts request datagrams for each product model number for each licensee.

* * * * *